Nov. 26, 1968 W. L. BROWN 3,413,449
RATE REGISTERING CIRCUIT
Filed April 26, 1965
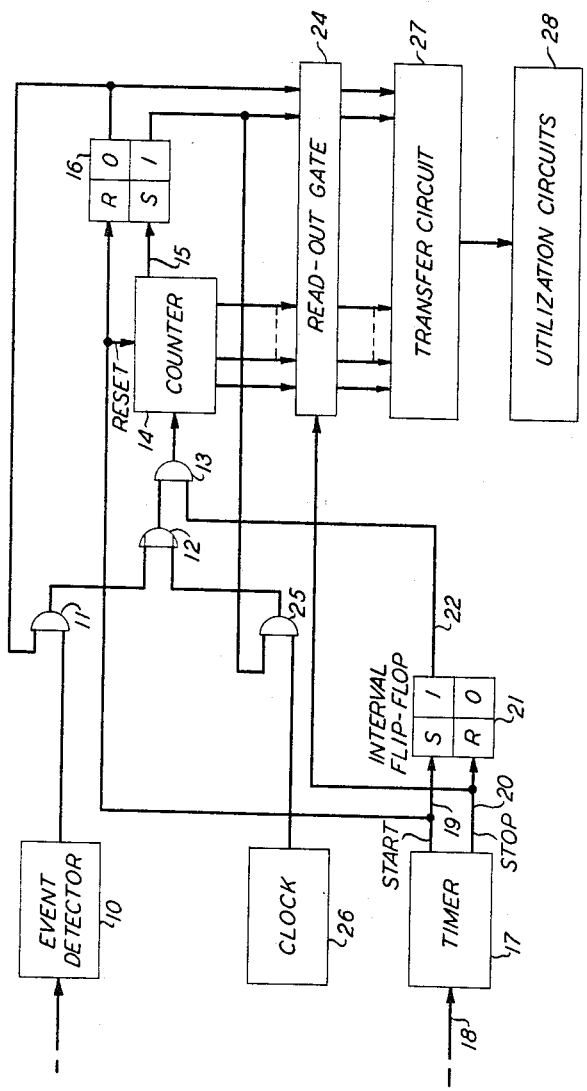
INVENTOR
W. L. BROWN
BY
R. O. Nimtz
ATTORNEY United States Patent Office
3,413,449
Patented Nov. 26, 1968

3,413,449
RATE REGISTERING CIRCUIT
Walter L. Brown, Berkeley Heights, N.J., assignor to Bell Telephone Laboratories, Incorporated, New York, N.Y., a corporation of New York
Filed Apr. 26, 1965, Ser. No. 450,986
8 Claims. (Cl. 235—92)

ABSTRACT OF THE DISCLOSURE

A time controlled counter for counting events having unknown rates of occurrence is disclosed. The counter's operation is such that, if during a selected counting interval, the number of occurrences being counted exceed the counter's capacity, the counter will be cleared and begin counting clock pulses of a known repetition rate to provide an indication of the point in the interval at which a counter overflow occurred.

---

This invention relates to counting circuits and, more particularly, to efficient arrangements for registering the counting rate of a counting circuit responsive to random or unknown events to be counted.

When it has been necessary to determine the average rate of occurrence of random events, it has heretofore been the practice to detect such events and to count the occurrences thereof over a fixed interval. The number of such events detected within the interval, divided by the length of the interval, is then equal to the average rate of occurrence for such events. Such arrangements have often been used to count random events such as the arrival of subatomic particles at a particle detector, or the occurrence of errors in an information handling system. In each case, the events occur at random and knowledge of their average rate of occurrence is important to the observers of the system.

In count rate registering circuits of the type described above, a counter having a finite counting range is used. It is, therefore, possible that an unexpectedly high rate of occurrence of the events to be counted may exhaust the counting capacity of the counter, thus resulting in the reporting of an erroneous count rate. On the other hand, the system may be arranged to detect count exhaustion, but, in that event, it becomes necessary to repeat the counting procedure for a new interval. Both of these alternatives involve serious disadvantages, particularly where the exceptionally high rates of occurrence are among the most significant results.

It is an object of the present invention to increase the counting range of count rate registers without increasing the count capacity of the counter being used.

It is a more particular object of the invention to provide a usable count rate from a count rate register irrespective of any unusually high counting rates.

In accordance with the present invention, a count rate register is provided which, like prior art rate registering circuits, is arranged to detect the events to be counted and to advance the counting circuit one unit for each detected event. Unlike prior art count rate registering circuits, however, the circuits of the present invention are arranged to detect overflow or carry from the counting circuit, and to utilize this overflow indication to switch the input of the counter circuit from the event detector to a source of regularly recurring clock pulses. The overflow indication of the counter is also registered in an overflow stage, the state of which therefore indicates whether or not the capacity of the counting circuits has been exhausted.

Upon the completion of the standard timing interval during which counting takes place, the contents of the counter, together with the state of the overflow stage, is read out and transferred to utilization circuits. It will be appreciated that the count in the counter at this time is either a count of the events detected during the timed interval, or is a count representing a time elapsed since the capacity of the counter was exhausted in counting detected events. The state of the overflow stage, of course, indicates which of the above alternatives is actually the case. Either of these counts can be used to calculate the average rate of occurrence of the events to be detected.

It can be seen that the count rate registering circuits of the present invention provide an indication of the average rate of occurrence of the events to be counted whether or not the capacity of the count is exceeded. The rate of occurrence of the clock pulses is, of course, selected so as to prevent exceeding the capacity of the counter in the interval that the count is taking place. The arrangement of the present invention may, therefore, be used to determine count rates for events which might normally be expected to exceed the capacity of the prior art rate circuits. In the alternative, the arrangements of the present invention permit using a counter of lower count capacity than the prior art arrangements for obtaining the same count rates.

As a comparison to prior art rate registering circuits, the case of a binary counter having $n$ stages may be considered. Using the prior art rate registering arrangements, a total of $2^n$ events can be counted in the assigned time interval. Using the arrangement of the present invention, on the other hand, permits the entire capability of the counter to be exhausted within the period of one clock pulse. The rate registered under these conditions is equivalent to counting $2^{2(n-1)}$ events in the same time interval. This is equivalent to providing a counter having almost twice the number of stages.

These and other objects and features, the nature of the present invention and its various advantages, will be more readily understood upon consideration of the attached drawing and the following detailed description of the drawing.

In the drawing, the single figure is a block diagram of a dual-mode rate registering circuit in accordance with the present invention.

Referring then to the figure of the drawing, there is shown a dual-mode rate registering circuit, in accordance with the present invention, comprising a detector 10 arranged to detect events occurring at random or unknown rates. Such events might, for example, comprise the arrival of subatomic particles at detector 10 or the occurrence of errors in an information handling system to which detector 10 is connected. In any event, detector 10 provides an output pulse for each event to be counted.

These pulses are applied by way of AND gate 11, OR gate 12, and AND gate 13 to a counting circuit 14. AND gates 11 and 13 are logic circuits of the type which produce an output when, and only when, all of their input leads are energized. The OR gate 12, on the other hand, is a logic circuit of the type which produces an output when any one or more of its input leads are energized. Counter 14 may comprise any known counting circuit for counting the pulses generated by detector 10. Counter 14 may, for example, comprise a binary counter having a plurality of stages and arranged to permutate the states of the various stages in accordance with one of the known binary codes. Such counting circuits are well known to those skilled in the art and will not be further described here.

Counting circuit 14 is provided with an output lead 15 which is energized when the capacity of the counter 14 is reached. In the normal counting circuit, output lead 15 represents the carry signal from the highest order stage of the counter 14. Output lead 15 is applied to the set ("S") input of an overflow stage 16 which may comprise any bistable circuit means capable of representing either one of two distinguishable conditions. Such bistable circuits are also well known to those skilled in the art and will not be further described here. It will be appreciated that stage 16 may actually comprise the last stage of a binary counter since the signal condition represented therein distinguishes between two possible sets of counts in the balance of the counter 14. Counter 14, on the other hand, may be a nonbinary counter, in which case stage 16, which need only be binary, i.e., two-interval, is a separate circuit.

The count rate registering circuit of the figure also includes a timer circuit 17 which may be triggered by an input lead 18 to set the time limits of the counting interval to be used. To this end, timer circuit 17 has two output leads 19 and 20. The first of these output leads, output lead 19, provides a signal at the beginning of the timed interval. Output lead 20, on the other hand, provides a signal at the termination of the timed interval.

Out put leads 19 and 20 are applied to the set and reset inputs, respectively, of interval flip-flop 21. Interval flip-flop 21 is a bistable circuit arranged to remain in either one of two stable states upon the application of a triggering signal to the corresponding one of two input terminals. Upon the application of a triggering signal to the set ("S") input, for example, flip-flop 21 is triggered to and remain in the "1" state, providing an output signal on output lead 22. Upon the application of a triggering signal to the reset ("R") input, the output signal is removed from output lead 22. Flip-flop circuit 21 is, therefore, normally in the reset condition, but is triggered to the set condition at the beginning of the timed interval and remains in that condition until the termination of the timed interval.

The start output from timer circuit 17 on lead 19 is also applied to reset inputs for counter circuit 14 and overflow stage 16. This input to circuits 14 and 16 returns these circuits to their normal states in which the counter indicates a zero count and the overflow stage is in its initial reset condition. The stop output of timer 17, appearing an output lead 20, is also applied to a read-out gate 24.

Overflow stage 16 has its "0" output lead connected to one input of AND gate 11 and its "1" output lead connected to one input of a similar AND gate 25. The other input to AND gate 25 is supplied from a clock pulse source 26.

Read-out gate 24 may comprise a plurality of individual gates, one for each of the output leads of counter circuit 14 as well as one for each output lead from overflow stage 16. When operated, read-out gate 24 transfers the count indicating signals from counter 14, and the state of overflow stage 16, from these circuits to transfer circuit 27. Transfer circuit 27 may, for example, comprise a transmission system, amplifiers, code translators, parallel-two-serial converters, or any other apparatus necessary to render the information derived from circuits 14 and 16 into a form most useful to the utilization circuits 28.

Utilization circuits 28 include the circuitry necessary to derive the actual count rate and hence includes means for computing this rate from the alternate sets of data which may be provided to it. Utilization circuit 28 may also include the means to alter or control the system or process by which the events detected by detector 10 are generated. Thus, the count rate registering circuits of the figure may be included in the feedback loop of a servocontrol system in which the output from the circuit of the figure is utilized to adjust its input.

In operation, a counting interval may be initiated by the application of a triggering signal by way of lead 18 to timer circuit 17. Alternatively, timer 17 may be arranged to generate start and stop signals at regularly recurring intervals. In any event, at the start of the timed interval, a signal appears on output lead 19 to reset counter circuit 14 and overflow stage 16, and to simultaneously set interval flip-flop 21. At this time, overflow stage 16 is therefore in the reset condition. Thus AND gate 11 is enabled to pass pulses from event detector 10 through OR gate 12 and AND gate 13 to counter 14.

Counter 14 continues to count these events as they are detected until the capacity of counter 14 is reached. At this time, an output signal appears on carry lead 15 from counter 14 which is used to set overflow stage 16. When set in this manner, overflow stage 16 disables AND gate 11 and enables AND gate 25. Thereafter, regularly occurring clock pulses from clock pulse source 26 are applied by way of AND gate 25, OR gate 12 and AND gate 13 to counter 14. These clock pulses are counted by counter 14 as they occur until timer circuit 17 produces a stop signal on output lead 20. This stop signal resets interval flip-flop 21 to disable AND gate 13, and operates read-out gate 24. Read-out gate 24 transfers the contents of counter 14 and the state of overflow stage 16 through transfer circuits 27 to utilization circuits 28. At this time, the count rate registering circuit of the figure is in a position to begin a new counting interval, either by the re-application of a triggering signal to input lead 18, or by a self-initiated recycling of timer circuit 17.

The clock rate of clock pulse source 26 is selected to prevent the exhaustion of the counting capacity of counter 14 during the timed interval. This can be assured, for example, by making the repetition rate of clock pulse source 26 equal to the count capacity of counter 14, divided by the duration of the timed interval set by timer 17. Faster clock pulse rates are, of course, possible, but only with the possibility of exhausting counter 14 during the clock counting mode.

It can be seen that the count rate registering circuits of the figure extends the counting range by a substantial factor over count rate registering circuits of the prior art. Indeed, the range of the count rate circuit of the figure is limited only by the resolvability of the clock pulses supplied by source 26.

It is to be understood that the above-described arrangements are merely illustrative of the numerous and varied other arrangements which may constitute applications of the principles of the invention. Such other arrangements may readily be devised by those skilled in the art without departing from the spirit or scope of this invention.

What is claimed is:

1. A rate registering circuit comprising a single counter, a source of events to be counted, a source of clocked events, overflow registering means for registering overflow from said counter, means responsive to said overflow registering means for transferring the input of said counter from said source of events to be counted to said source of clocked events, means for enabling said counter, and means for disabling said counter at a predetermined interval later, said last-named means also reading the count from said counter and the contents of said overflow registering means.

2. Means for determining the average rate of occurrence of irregularly occurring events comprising means for generating a pulse in response to each occurrence of said events, a source of regularly recurring pulses, a single counter, means responsive to a start signal for connecting said pulse generating means to said counter, means responsive to a carry signal propagated to the last stage of said counter for connecting said regularly recurring pulse source to said counter, and means responsive to a stop signal for reading the contents of said counter.

3. A pulse rate detector comprising a source of irregularly occurring pulses, a source of clock pulses, a single counter for counting said irregularly occurring pulses up to the capacity of said counter and for thereafter counting said clock pulses with said counter, and means for initiating and terminating the counting operation before and after a preselected time interval respectively.

4. In combination, a single counter, a source of pulses to be counted, a source of clock pulses, interval marking means, means responsive to said interval marking means for connecting said source of pulses to be counted to said counter at the beginning of said interval, means responsive to overflow from said counter for connecting said source of clock pulses to said counter, and means responsive to said interval marking means for disconnecting said pulse sources from said counter at the end of said interval.

5. The combination according to claim 4 wherein said source of pulses to be counted comprises subatomic particle detecting means.

6. The combination according to claim 4 wherein said counter comprises a binary counter, and wherein said overflow comprises a carry signal to the last stage of said binary counter.

7. The combination according to claim 4 wherein said interval marking means comprises timing means triggered by an externally applied signal.

8. The combination according to claim 4 wherein said interval marking means comprises self-recycling timing means.

References Cited
UNITED STATES PATENTS 2,803,405   8/1957   Howell.
3,160,740   12/1964   Mann.

MAYNARD R. WILBUR, *Primary Examiner.*

G. J. MAIER, *Assistant Examiner.*